C. H. NORTON.
CENTER AND TOOL HOLDER.
APPLICATION FILED OCT. 24, 1916.

1,261,157.

Patented Apr. 2, 1918.

Witness:
C. F. Nisson

Inventor
C. H. Norton
by attorneys
Southgate & Southgate

UNITED STATES PATENT OFFICE.

CHARLES H. NORTON, OF WORCESTER, MASSACHUSETTS, ASSIGNOR TO NORTON GRINDING COMPANY, OF WORCESTER, MASSACHUSETTS, A CORPORATION OF MASSACHUSETTS.

CENTER AND TOOL-HOLDER.

1,261,157.　　　　Specification of Letters Patent.　　Patented Apr. 2, 1918.

Application filed October 24, 1916. Serial No. 127,395.

*To all whom it may concern:*

Be it known that I, CHARLES H. NORTON, a citizen of the United States, residing at Worcester, in the county of Worcester and State of Massachusetts, have invented a new and useful Center and Tool-Holder, of which the following is a specification.

This invention relates to a combined center and tool holder particularly adapted to support a diamond tool for dressing a grinding wheel in a cylindrical grinding machine.

It is of the greatest importance in grinding cylindrical work that the wheel should be faced exactly parallel to the axis of the work centers. It is not always possible, even at great labor and expense, to secure an exact parallel relation both horizontally and vertically between the grinding wheel shaft and the axis of the work centers, but the objectionable results of defective alinement may be entirely eliminated by facing the grinding wheel exactly parallel to the axis of the work centers at the cutting point. If the wheel shaft and the axis of the centers are not parallel, this parallel facing of the grinding wheel can only be accurately accomplished by the use of a tool moving with the centers and work table, and held in the horizontal plane of the centers. Otherwise the wheel will be faced at a slight angle to the axis of the work centers, and will consequently leave a slight spiral depression in the finished work, this depression being cut by the high corner of the wheel.

It is the object of my invention to provide an improved device for thus holding a diamond or facing tool at the level of the work axis, so formed that the cutting point will always be positioned at this level. More specifically, it is the special object of my invention to provide an integral work center and tool holder designed to support the tool by the work center with its cutting point in the horizontal plane of the center.

As herein shown I provide a center having an enlarged shank held from rotation or angular movement and having a hole extending horizontally therethrough within which the cylindrical body of a diamond tool may be conveniently adjusted longitudinally.

Further features of my invention relate to certain arrangements and combinations of parts which will be hereinafter described and more particularly pointed out in the appended claims.

A preferred form of my invention is shown in the drawings, in which—

Figure 1:
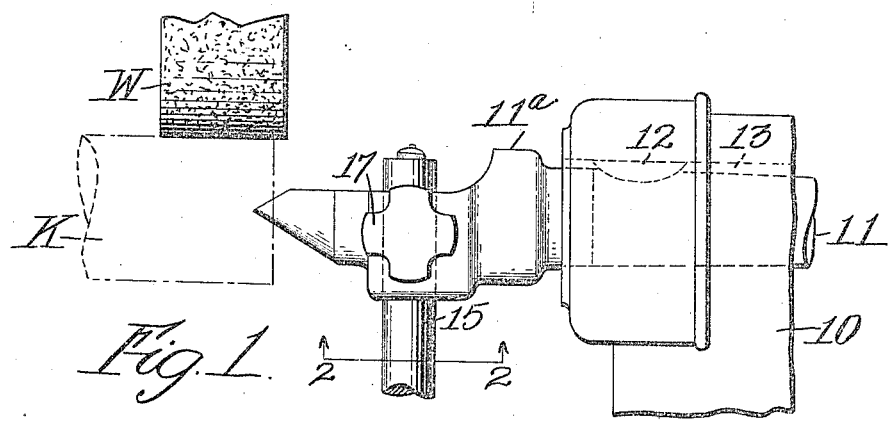
Figure 1 is a top plan view of my improved center and tool holder.
Figure 2:
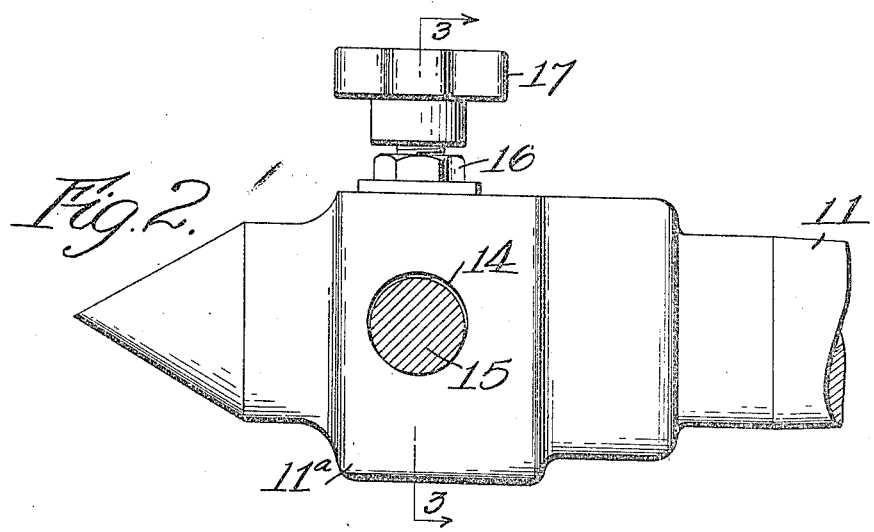
Fig. 2 is a side elevation of the device shown in Fig. 1.
Figure 3:
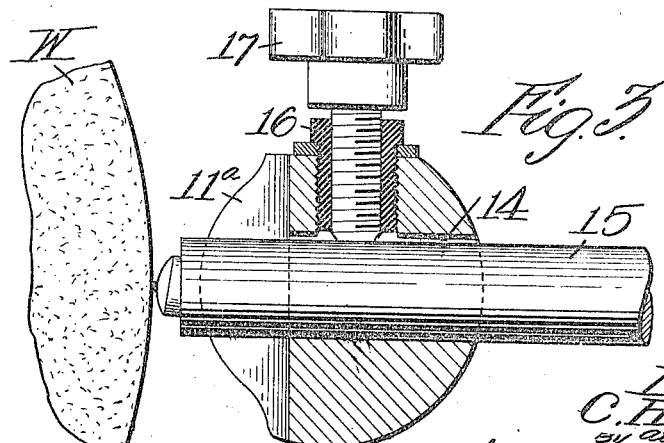
Fig. 3 is a sectional view thereof taken along the line 3—3 in Fig. 2.

Referring to the drawings, I have indicated at 10 the foot stock of a grinding machine in which a center 11 has a tapered bearing. The center is held in fixed angular position in the foot stock by a key 12 mounted in the center and fitting in a key-way 13 in the foot stock. The work is indicated at K and the wheel at W.

The center 11 is provided with an enlarged shank portion 11ª and is cut away on one side to permit the grinding wheel to approach more closely to small work. A transverse hole 14 is formed in the enlarged shank portion 11ª and a diamond tool 15 fits loosely within the hole 14. The hole 14 is so formed that it will be exactly horizontal when the spindle is inserted in the foot stock with the key 12 fitting in the key-way 13.

A bushing 16 is threaded into the center 11 at right angles to the hole 14, and is threaded to receive a binding screw 17 extending through the bushing into position to engage the tool 15.

With this construction it will be seen that the tool 15 may be inserted or removed from the work center 11 at will, and may project a greater or less distance through the center, but in all operative positions the cutting point will be in the horizontal plane of the work centers. The wheel W will therefore be faced exactly parallel to the work centers and in the exact plane of the cutting operation. The bushing 16 is provided for replacement whenever the inner thread becomes worn and the binding screw 17 becomes loose.

While the device has been shown as applied to a foot stock it will of course be evident that it can be used equally well in a head stock.

Having thus described my invention it will be evident that changes and modifications can be made therein without departing from the spirit and scope thereof as set forth in the claims, and I do not wish to be otherwise limited to the details herein disclosed, but what I claim is:—

1. In a grinding machine, a grinding wheel, a work center, a facing tool, and means to support said facing tool in fixed relation to said center with the cutting point of said tool substantially in the common plane of the axes of said wheel and center.

2. In a grinding machine, a grinding wheel, a facing tool, and a combined center and facing tool holder comprising a center and means to support a tool thereby, said tool being longitudinally adjustable but having its working point always positioned in the plane of the axes of said center and grinding wheel.

3. In a grinding machine, a grinding wheel, a work support, a center, means to position said center in a predetermined angular relation to said work support, a facing tool adjustable along a radius of said center, and means to secure said tool in adjusted position.

4. In a grinding machine, a grinding wheel, a work center, means to position said center at a fixed angle in said machine, said center having an opening extending transversely through its axis and substantially parallel to a line joining the axes of said center and wheel, a facing tool longitudinally adjustable in said opening, and means to secure said tool in adjusted position.

5. A combined center and facing tool holder comprising a center having an enlarged shank portion with a transverse opening through the axis of said center adapted to receive a facing tool, and means to secure said tool in adjusted radial position, said latter means including a bushing threaded into the shank of said center and a binding screw threaded into said bushing and engaging said tool.

6. In a machine for grinding cylindrical surfaces, a grinding wheel, a work supporting center determining the surface of revolution produced by grinding, a wheel dressing device, and means to support said device in position to dress said grinding wheel and in radial alinement between the centers of rotation of the work and wheel, thereby dressing the wheel face at the line of grinding contact and parallel with the axis of the work supporting center.

In testimony whereof I have hereunto affixed my signature.

CHARLES H. NORTON.